United States Patent
Senga et al.

(10) Patent No.: US 6,905,007 B2
(45) Date of Patent: Jun. 14, 2005

(54) DRIVE POWER TRANSMISSION COMPRISING ELECTROMAGNETIC CLUTCH

(75) Inventors: Yoshiaki Senga, Kariya (JP); Hiroshi Takuno, Kariya (JP); Hiroyuki Inoue, Kariya (JP); Yasuyuki Watanabe, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/415,658

(22) PCT Filed: Nov. 8, 2001

(86) PCT No.: PCT/JP01/09766
§ 371 (c)(1),
(2), (4) Date: Sep. 2, 2003

(87) PCT Pub. No.: WO02/38976
PCT Pub. Date: May 16, 2002

(65) Prior Publication Data
US 2004/0216973 A1 Nov. 4, 2004

(30) Foreign Application Priority Data
Nov. 8, 2000 (JP) ....................................... 2000-340604

(51) Int. Cl.$^7$ ............................................... F16D 27/10
(52) U.S. Cl. ...................... 192/35; 192/48.2; 192/93 A; 192/110 R
(58) Field of Search ...................... 192/35, 84.7, 84.91, 192/112, 115, 48.2, 93 A, 110 R

(56) References Cited

U.S. PATENT DOCUMENTS 5,454,457 A * 10/1995 Sakai et al. .................... 192/35

FOREIGN PATENT DOCUMENTS

| JP | 10-329562 | 12/1998 |
| JP | 2000-234635 | 8/2000 |

* cited by examiner

Primary Examiner—Saul Rodriguez
(74) Attorney, Agent, or Firm—Oblon, Spivak, McClelland, Maier & Neustadt, P.C.

(57) ABSTRACT

In a power transfer device composed of a bottomed cylindrical housing 20a rotatably mounted on an inner shaft 20b and a main friction clutch 20c and a pilot friction clutch 30a coaxially assembled within a cylindrical space between the housing 20a and inner shaft 20b through a cam mechanism 30b, the thickness of a shim plate 39b for adjustment of a clearance between an inner clutch plate or outer clutch plate located at one side of an electromagnetic clutch 30a used as the pilot friction clutch and an inner end surface of an end wall block 21b threaded into an opening end portion of the housing 20a is determined on a basis of a clearance L1 between one side surface of a thrust bearing 39a assembled with an input cam member 35 of the cam mechanism 30b and an inner clutch plate or outer clutch plate located at one side of the electromagnetic clutch 30a.

5 Claims, 3 Drawing Sheets

DRIVE POWER TRANSMISSION COMPRISING ELECTROMAGNETIC CLUTCH

FIELD OF THE INVENTION

The present invention relates to a power transfer device, and more particularly to a power transfer device suitable for transmitting a drive power from a set of front road wheels to a set of rear road wheels in an automotive vehicle of the four-wheel drive type.

DESCRIPTION OF THE PRIOR ART

Disclosed in Japanese Patent Laid-open Publication No 2000-234635 is a power transfer device of this kind which comprises a bottomed cylindrical housing rotatably mounted on an inner shaft and a main frictional clutch and a pilot clutch coaxially assembled through a cam mechanism within a cylindrical space between the housing and the inner shaft. In the power transfer device, the pilot clutch is in the form of an electromagnetic friction clutch including a plurality of inner clutch plates assembled with an input member of the cam mechanism, a plurality of outer clutch plates assembled with an internal periphery of the housing and interposed among the inner clutch plates, an end wall block threaded into an opening end of the housing and positioned in place in a condition rotatably coupled with the inner shaft for retaining at its inner end surface one of the inner clutch plates or outer clutch plates located at one side of the pilot friction clutch, an electromagnet assembled in the end wall block and an armature assembled with an inner peripheral surface of the housing at the other side of the pilot friction clutch to be movable in an axial direction. In the pilot clutch mechanism, the armature is attracted by magnetic force of the electromagnet to effect engagement of the friction clutch.

If in the power transfer device, a slight clearance between the inner end surface of the end wall block and the inner clutch plate or outer clutch plate located at one side of the friction clutch is lager than a predetermined value, there will occur a delay in engagement action of the pilot friction clutch due to decrease of the attraction force to the armature. For this reason, it is important to determine the slight clearance between the inner end surface of the end wall block and the inner clutch plate or outer clutch plate in the predetermined value at the assembly process of the power transfer device. It is, however, difficult to determine the slight clearance in the predetermined value at the assembly process of the power transfer device, since the clearance is influenced by the thickness of the inner clutch plates or outer clutch plates and accuracy of the axial length of the end wall block. In the power transfer device, it is also required to determine a clearance between the clutch plates of the main friction clutch in a predetermined value for properly setting a pre-torque applied thereto in engagement action.

To solve the problems described above, the conventional power transfer device has been tried out to confirm engagement action of the pilot friction clutch in a condition where a shim plate of appropriate thickness was assembled for adjustment of the slight clearance. In the occurrence of delay in response of torque transmission or dragging torque at trial of the power transfer device, it is required to remove the assembled shim plate for replacement. This takes plenty of time for assembly of the power transfer device. In addition, there is a possibility of increase or decrease of the clearance adjusted by the shim plate when the end wall block is positioned in place after replacement of the shim plate.

It is, therefore, a primary object of the present invention to provide a power transfer device wherein the slight clearance between the inner end surface of the end wall block and the inner clutch plate or outer clutch plate located at one side of the pilot friction clutch can be precisely determined in a predetermine value at the assembly process of the power transfer device and maintained in the predetermined value after adjustment.

Another object of the present invention is to provide a power transfer device capable of precisely determining the slight clearance in the predetermined value and of adjusting a clearance between the clutch plates of the main friction clutch in a simple manner.

SUMMARY OF THE INVENTION

According to the present invention, the primary object is attained by providing a power transfer device which comprises a bottomed cylindrical housing rotatably mounted on an inner shaft and a main frictional clutch and a pilot clutch coaxially assembled through a cam mechanism within a cylindrical space between the housing and the inner shaft. In the power transfer device, the pilot clutch is in the form of an electromagnetic friction clutch including a plurality of inner clutch plates assembled with an input member of the cam mechanism, a plurality of outer clutch plates assembled with an internal periphery of the housing and interposed among the inner clutch plates, an end wall block threaded into an opening end of the housing and positioned in place in a condition rotatably coupled with the inner shaft for retaining one of the inner clutch plates or outer clutch plates located at one side of the pilot friction clutch by engagement therewith at its inner end surface, an electromagnet assembled in the end wall block and an armature assembled with an inner peripheral surface of the housing at the other side of the pilot friction clutch to be movable in an axial direction, wherein the armature is attracted by magnetic force of the electromagnet to effect engagement of the friction clutch, and wherein a thrust bearing is placed between the input member of the cam mechanism and the end wall block, an adjustment member is disposed between the thrust bearing and the end wall block for adjusting a clearance between the inner end surface of the end wall block and one of the inner clutch plates or outer clutch plates located at one side of the friction clutch, and the thickness of the adjustment member is determined on a basis of a space between one side surface of the thrust bearing and the inner clutch plate or outer clutch plate located at one side of the friction clutch.

The secondary object is attained by providing the power transfer device wherein a clearance between the clutch plates of the main friction clutch can be adjusted by adjustment of the fixed position of the end wall block.

DESCRIPTION OF THE PREFERRED EMBODIMENT

Figure 1:
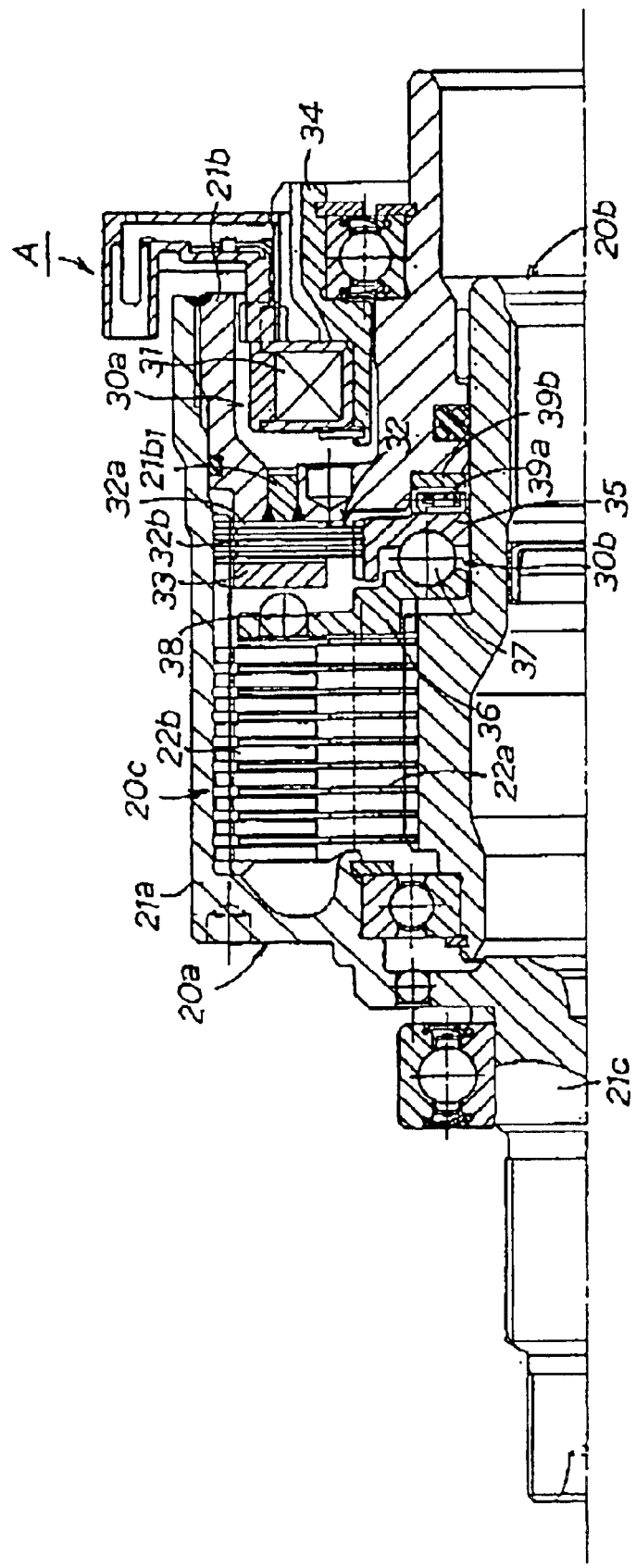
FIG. 1 is a partial sectional view of a preferred embodiment of a power transfer device in accordance with the present invention.
Figure 5:
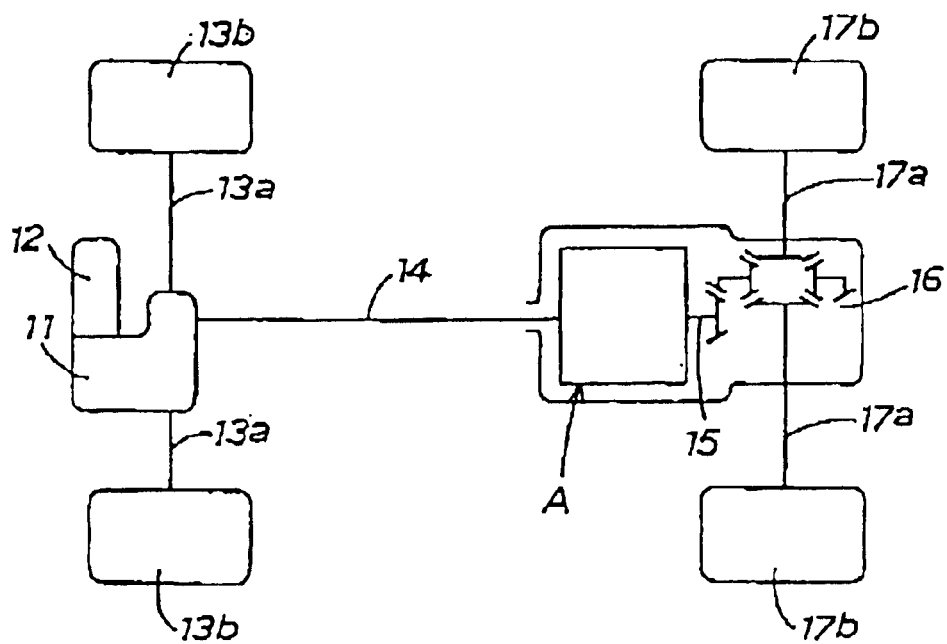
FIG. 5 is a schematic illustration of an automotive vehicle equipped with the power transfer device shown in FIG. 1.

Illustrated in FIG. 1 is a partial section of a preferred embodiment of a power transfer device A in accordance with the present invention, which is adapted for use in an automotive vehicle of the four-wheel drive type to transfer drive power from a set of front road wheels to a set of rear road wheels as shown in FIG. 5. In the automotive vehicle shown in FIG. 5, a trans-axle 11 is composed of a transmission, a transfer and a front differential. Drive power of a prime mover 12 is transmitted to a pair of axle-shafts 13a, 13a through the front differential of trans-axle 11 and to a propeller shaft 14 drivingly connected to a drive pinion shaft 15 trough the power transfer device A. When a main friction clutch in the power transfer device A is engaged, the device power from the tans-axle 11 is transmitted to a pair of axle-shafts 17, 17a through a rear differential 16 to drive the rear road wheels 17, 17b.

As shown in FIG. 1, the power transfer device A includes a bottomed cylindrical housing 20a rotatably mounted on an inner shaft 20b and a main friction clutch 20c and a pilot clutch 30a assembled within a space between the cylindrical housing 20a and the inner shaft 20b and arranged coaxially through a cam mechanism 30b. The housing 20a is integrally formed with a connection shaft 21c for connection to the propeller shaft 14 shown in FIG. 5. The end wall block 21b is made of magnetic material and includes a cylindrical member of stainless steel coupled therein to form an annular non-magnetic portion. The inner shaft 20b is inserted into the housing 20a through the end wall block 21b in a liquid-tight manner. The inner shaft 20b is rotatably supported at its inner end on a front end wall of housing 20a through a ball beating and connected at its outer end to a drive pinion shaft 15 as shown in FIG. 5.

The main friction clutch 20c is in the form of a wet-type friction clutch which is composed of a plurality of inner clutch plates 22a splined at their inner ends with the inner shaft 20b to be movable in an axial direction and a plurality of outer clutch plates 22b splined at their outer ends with the inner periphery of housing 20a to be movable in an axial direction. The inner clutch plates 22a are interposed between the outer clutch plates 22b to be brought into friction engagement with each other. When engaged, the main friction clutch 20c acts to transmit the drive power applied from the propeller shaft 14 through the housing 20a to the inner shaft 20b.

Figure 2:
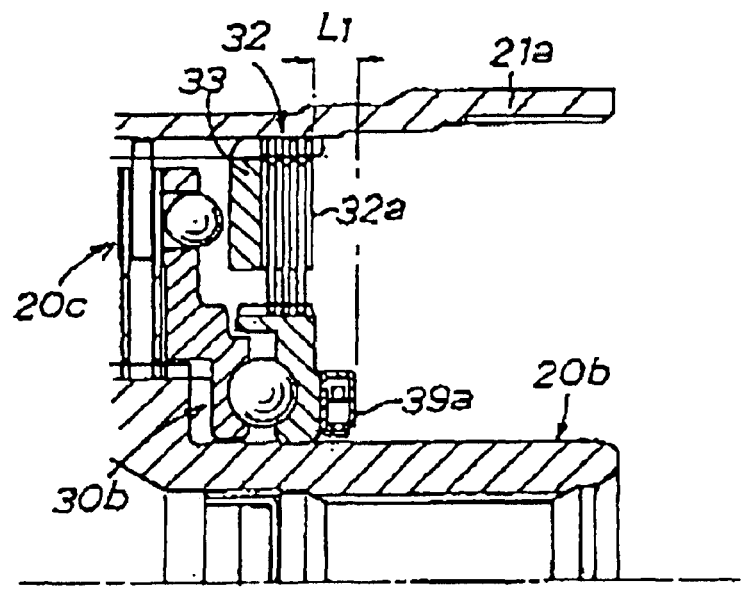
FIG. 2 is a partial sectional view illustrating a condition before an adjustment shim plate is assembled at the assembly process of the power transfer device shown in FIG. 1.

As shown in FIGS. 1 and 2, the pilot friction clutch 30a is in the form of an electromagnetic clutch which includes a wet-type friction clutch assembly 32 composed of a plurality of inner clutch plates 32b splined at their inner ends with an input cam member 35 of cam mechanism 30b to be movable in an axial direction, a plurality of outer clutch plates 32a splined at their outer ends with the internal periphery of housing 20a to be movable in an axial direction, the end wall block 21b threaded into an opening end portion of housing 20a and positioned in place for retaining the outer clutch plate 32a located at one side of the friction clutch assembly 32 by engagement therewith, a electromagnet 31 assembled in the end wall block 21b, and an annular armature 33 assembled with the internal periphery of housing 21a at the other side of the friction clutch assembly 32 to be movable in an axial direction. In the pilot friction clutch 30a, the armature 33 is attracted by magnetic force generated by activation of the coil of electromagnet 31 to effect engagement of the friction clutch assembly 32. The coil of electromagnet 31 is annularly formed and contained in an annular recess of the end wall block 21b in a condition coupled with a cylindrical yoke 34. The yoke 34 is supported on a cylindrical portion of end wall member 21b trough a ball bearing.

The cam mechanism 30b placed between the main friction clutch 20c and the pilot friction clutch 30a is composed of the input cam member 35, an output cam member 36 and a plurality of cam followers 37 disposed between the cam members 35 and 36. The input cam member 35 is rotatably coupled with the inner shaft 20b for support of the inner clutch plates 32b. The output cam member 36 is splined to the inner shaft 20b in such a manner that an annular flange of output cam member 36 is located between the main friction clutch 20c and armature 33. The cam followers 37 each are in the form of a steel ball disposed in a cam groove formed on the cam members 35, 36 and opposed to each other. In addition, a plurality of circumferentially spaced stainless steel balls 38 are carried by the annular flange of output cam member 36 to maintain a space between the output cam member 36 and armature 33 in a predetermined distance in an axial direction.

In the cam mechanism 30b, a thrust bearing 39a and an annular shim plate 39b are disposed between the input cam member 35 and the end wall block 21b. The shim plate 39b is coupled within an annular recess 21b2 formed on an inner periphery of the end wall block 21b and maintained in engagement with the thrust bearing 39a under thrust force caused by thread fastening of the end wall block 21b. The thrust bearing 39a is provided to permit relative rotation of the input cam member 35 to the end wall block 21b and to maintain a clearance between an inner end surface of the end wall block 21b and the outer clutch plate located at the rightmost end of friction clutch assembly 32 in a predetermined value.

In such an assembled condition as described above, the end wall block 21b is treaded into the opening end portion of housing 20a and positioned in place in such a manner that clearances among the inner clutch plates 22a and outer clutch plates 22b in the main friction clutch 20c are adjusted by thrust force of the end wall block 21b applied thereto through the cam mechanism 30b for adjustment of a pre-torque applied to the main friction clutch 20c.

In the power transfer device A described above, the pilot friction clutch 32 and the main friction clutch 20c each are maintained in a disengaged condition during deactivation of the coil of electromagnet 31. In such a condition the drive power applied to the housing 20a may not be transferred to the inner shaft 20b, and the clearance between the inner end surface of end wall block 21b and the outer clutch plate 32a located at the rightmost end of pilot friction clutch 32 is maintained in a predetermined value as described later. Thus, the vehicle equipped with the power transfer device A is driven at a first drive mode for two wheel drive.

When the coil of electromagnet 31 is energized by electric current applied thereto, a magnetic flux is formed across the yoke 34, end wall block 21b, pilot friction clutch 32 and armature 33, and the armature 33 is attracted by magnetic force of the electromagnet 31 toward the pilot friction clutch 32 to effect engagement of the pilot friction clutch 32. This causes relative rotation of the cam members 35 and 36 of the cam mechanism 30b and causes the cam followers 37 to thrust the output cam member 36 toward the main friction clutch 20c. As a result, the main friction clutch 20c is engaged in accordance with engagement force of the pilot friction clutch 32 to transfer the drive torque to the inner shaft 20b from the housing 20a. Thus, the vehicle is driven at a second drive mode for four-wheel drive. At this second drive mode, the distribution ratio of the drive power between the front and rear road wheels can be controlled in a range of 100:0 (two-wheel drive) to 50:50 (direct drive).

When the electric current applied to the coil of electromagnet 31 during the operation of power transfer device A is increased to a predetermined value, the magnetic attraction force of the electromagnet 31 to the armature 33 increases to increase the friction engagement force of pilot friction clutch 32. As a result, the thrust force of the output cam member 36 to the main friction clutch 20c increases to complete the engagement of main friction clutch 20c. Thus, the vehicle is driven at a third drive mode for four-wheel direct drive.

Figure 3:
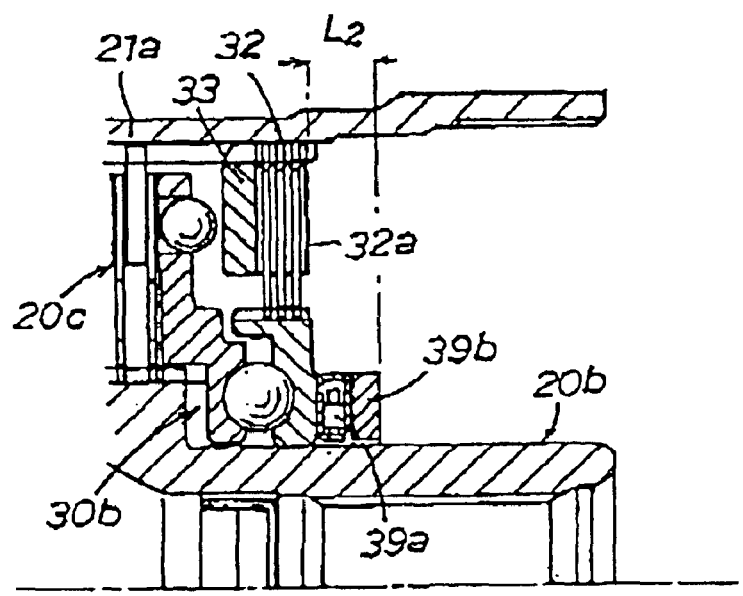
FIG. 3 is a partial sectional view illustrating a condition after the adjustment shim plate has been assembled at the assembly process of the power transfer device shown in FIG. 1.

Hereinafter, an assembly process of the power transfer device A will be described with reference to FIGS. 2 to 4. The shim plate 39 assembled with the internal periphery of end wall block 21b is selected from a plurality of shim plates different in thickness at the assembly process of the power transfer device A. In this instance, the standard for selection of the shim plates is determined on a basis of a measured value of the clearance L1 between the outer clutch plate 32a located at the rightmost end of pilot friction clutch 32 and one side surface of the trust bearing in engagement with the input cam member 35 of the cam mechanism 30b.

Figure 4:
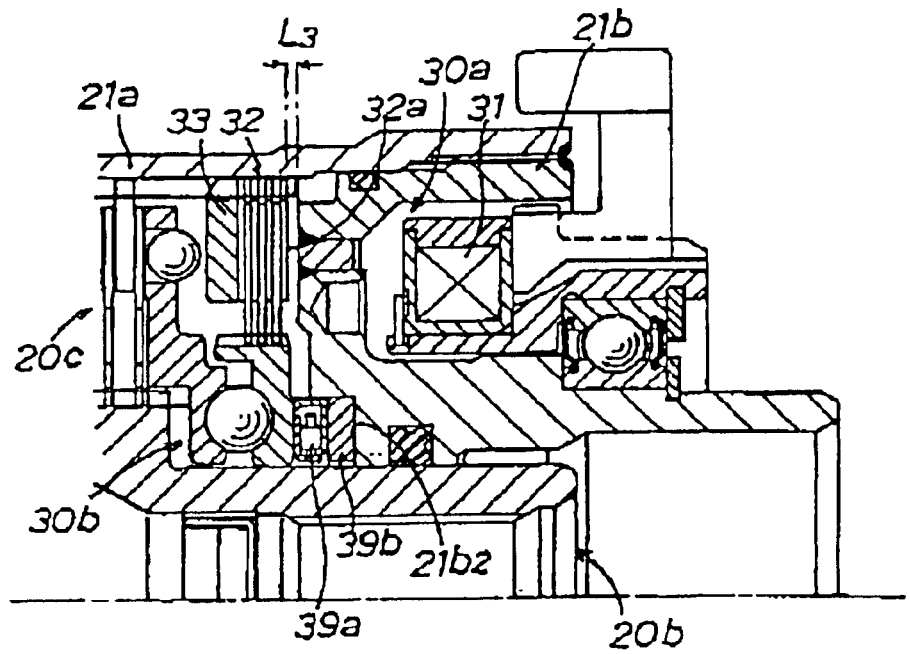
FIG. 4 is a partial sectional view illustrating a condition where an end wall block has been positioned in place after the adjustment shim plate was assembled at the assembly process of the power transfer device shown in FIG. 1.

As shown in FIG. 2, the clearance L1 between the outer clutch plate 32a located at the rightmost end of pilot friction clutch 32 and the one side surface of the thrust bearing 39a for engagement with the input cam member 35 is measured, and the thickness of shim plate 39b is selected on a basis of the measured clearance L1 in such a manner that a clearance L3 shown in FIG. 4 is defined in the predetermined value. Subsequently, a clearance L2 between one side surface of the outer clutch plate 32a located at the rightmost end and one side surface of the shim plate 39b is measured in a condition where the selected shim plate 39b has been assembled as shown in FIG. 3. Thus, the properness of selection of the shim plate 39b is confirmed on a basis of the measured clearance L2. Thereafter, the end wall block 21b is threaded into the opening end portion of housing 20a and positioned in place by engagement with the shim plate 39b in the axial direction so that the clearance L3 is retained in the predetermined value between the inner end surface of end wall block 21a and the one side surface of outer clutch plate 32a. In such a condition, the cam mechanism 30b is pressed by the end wall 21b through the thrust bearing 39a and shim plate 39b in the axial direction to apply pre-torque to the main friction clutch 20c. The thrust force to the main friction clutch 20c can be finely adjusted by forward or retraction of the end wall block 21b for adjusting the pre-torque applied to the main friction clutch 20c in a desired value. When positioned in place after adjustment in the axial direction, the end wall block 21b is welded to the opening end portion of housing 20a to retain the clearance L3 in the predetermined value and to maintain the pre-torque to the main friction clutch 20c in the predetermined value.

In such an assembly process of the power transfer device as described in in detail above, the thickness of shim plate 39b is determined on a basis of the clearance L1 between the outer clutch plate or inner clutch plate located at one side of the pilot friction clutch and one side surface of the thrust bearing for adjustment of the clearance L3 to the predetermined value. With such arrangement of the shim plate, it is able to eliminate replacement work of the shim plate after assembly of the power transfer device.

As in the power transfer device, the end wall block 21b is forwarded or retracted at the opening end portion of housing 20a in the axial direction for fine adjustment, the clearance L3 and the pre-torque to the main friction clutch 20c can be adjusted to the predetermined value after the shim plate 39b is assembled in place.

What is claimed is:

1. A power transfer device comprising a bottomed cylindrical housing rotatably mounted on an inner shaft and a main friction clutch and a pilot friction clutch coaxially assembled through a cam mechanism within a cylindrical space between the housing and the inner shaft, wherein the pilot friction clutch is in the form of an electromagnetic friction clutch including a plurality of inner clutch plates assembled with an input member of the cam mechanism, a plurality of outer clutch plates assembled with an inner periphery of the housing and interposed among the inner clutch plates, wherein one of the inner clutch plates or outer clutch plates is located at one side of the pilot friction clutch, an end wall block threaded into an opening end portion of the housing and positioned in place in a condition rotatably coupled with the inner shaft for retaining the one of the inner clutch plates or outer clutch plates located at one side of the pilot friction clutch by engagement therewith at its inner end surface, an electromagnet assembled in the end wall block and an armature assembled with an internal periphery of the housing at the other side of the friction clutch to be movable in an axial direction, wherein the armature is attracted by magnetic force of the electromagnet to effect engagement of the pilot friction clutch, a thrust bearing placed between the input member of the cam mechanism and the end wall block, an adjustment member disposed between the thrust bearing and the end wall block for adjusting a clearance between the inner end surface of the end wall block and the one of the inner clutch plates or outer clutch plates located at one side of the pilot friction clutch, and wherein a thickness of the adjustment member is a function of a distance between one side surface of the thrust bearing and the inner clutch plate or outer clutch plate located at one side of the pilot friction clutch.

2. A power transfer device as claimed in claim 1, wherein the clearance among clutch plates of the main friction clutch is adjusted by adjusting the fixed position of the end wall block.

3. A power transfer device as claimed in claim 1, wherein the cam mechanism comprises a pair of cam members mounted on the inner shaft for relative rotation and a cam follower interposed between the cam members.

4. A power transfer device as claimed in claim 1, wherein the electromagnet is contained in an annular recess formed in the end wall block and supported on the end wall block for relative rotation.

5. A power transfer device as claimed in claim 1, wherein the end wall member is positioned in place by welding.

* * * * *